June 14, 1966  E. A. LÖFGREN ETAL  3,255,903
TRACTOR EQUIPPED WITH HOISTING IMPLEMENT
Filed Nov. 13, 1963  5 Sheets-Sheet 1
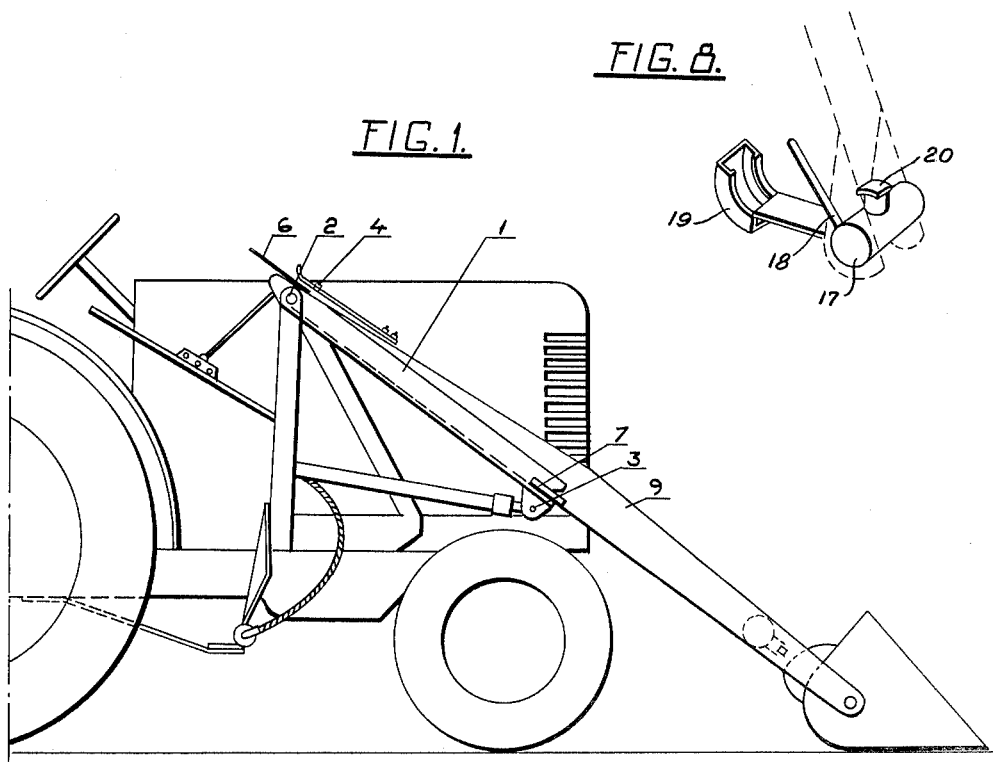
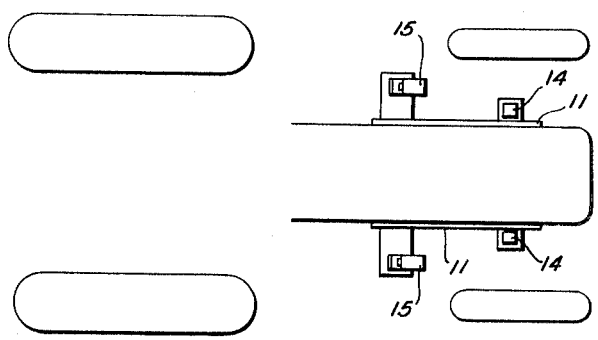
INVENTORS:
E. A. Löfgren and K. G. Holmberg
BY
Richards & Geier
ATTORNEYS

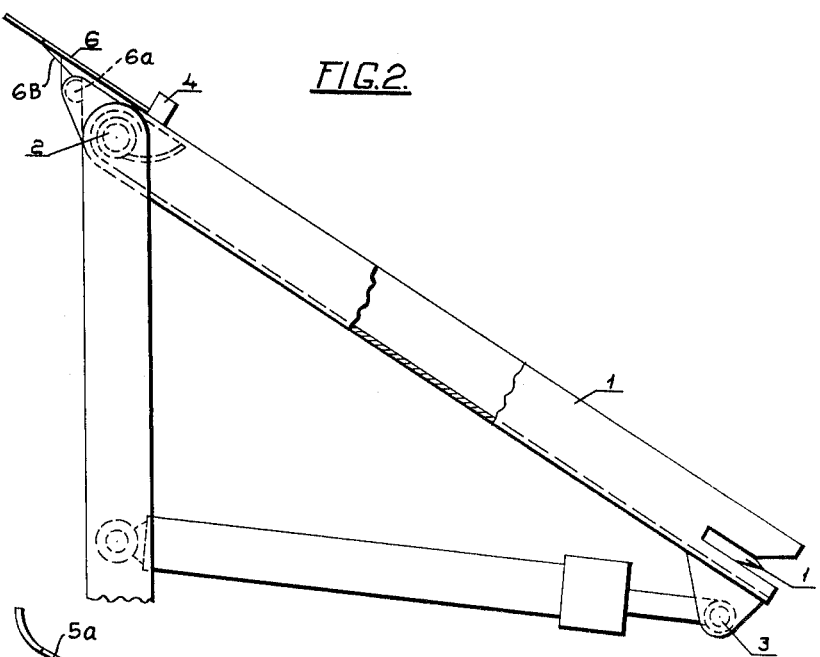
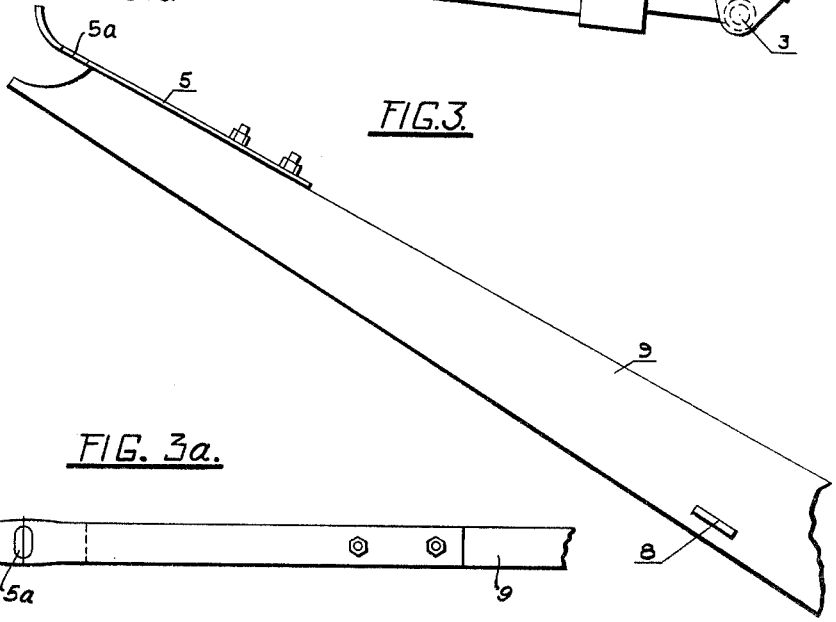
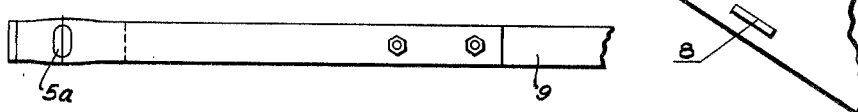
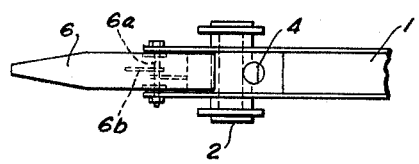

June 14, 1966 E. A. LÖFGREN ETAL 3,255,903
TRACTOR EQUIPPED WITH HOISTING IMPLEMENT
Filed Nov. 13, 1963 5 Sheets-Sheet 3

INVENTORS:
E.A.Löfgren and K.G.Holmberg
BY Richards & Geier
ATTORNEYS

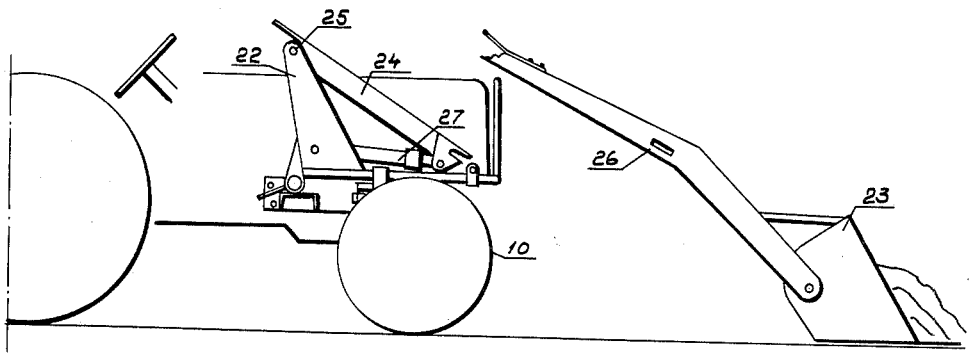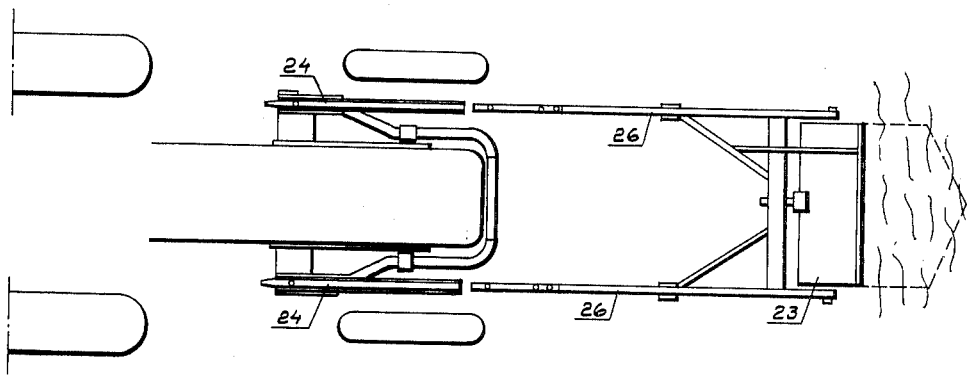

United States Patent Office 3,255,903
Patented June 14, 1966

3,255,903
TRACTOR EQUIPPED WITH HOISTING
IMPLEMENT
Erik Alfons Löfgren, Umea, and Karl Gösta Holmberg,
Robertsfors, Sweden, assignors to Kommanditbolaget
Modigs Verkstäder, Umea, Sweden
Filed Nov. 13, 1963, Ser. No. 323,401
3 Claims. (Cl. 214—140)

The rationalization of farm work by the provision of new machines, makes it necessary in many quarters, particularly in connection with small farms, to utilize a tractor for a multitude of various tasks despite the high costs involved. It is important then, if the tractor is furnished with a loading unit, that the tractor be capable of being rapidly detached for other work. In conventional arrangements of tractors now to be had in the market, especially with respect to loading apparatus, the problem encountered was that disengagement and engagement would take a long time.

One of the objects of the present invention is to solve this drawback, and the arrangement according to the invention refers to tractors equipped with hoisting implements.

A distinguishing feature of the invention consists in that the hoisting implement is fitted with a bucket or other appliance adapted to be removably united with the lifting unit of the tractor with the aid of such guideway-, control- and/or locking means as to automatically couple the hoisting implement to the lifting unit upon the advancement of the tractor in the driving direction, whereas upon the removal of the tractor in a direction reversed to the driving direction the above-named means will detach the hoisting implement from the lifting unit through manual actuation.

By means like those described garaging of the vehicle is also facilitated, inasmuch as the hoisting implement may then be placed outside the garage.

The invention is also concerned with a modified form of embodiment of the abovementioned arrangement, and the latter is principally characterized by the feature that the lifting unit of the tractor is adapted to be removably coupled to the same by means of manually operable locking members.

Such a modified embodiment facilitates rapid loosening of the lifting unit from the tractor, since the latter is then to be used solely for transport and assembling of the same, whereby the tractor is to be used for loading and transport. Because of the fact that the hoisting implement is removably connected to the loading unit, as stated above, a single person will suffice for the operation of said parts in connecting the same with one another and with the tractor and in loosening the same from each other and from the tractor.

The invention will be described in greater detail herein below and is illustrated with the aid of the annexed drawings.

Referring to the drawings:

FIG. 1 is a lateral view of a tractor with a hoisting implement coupled to the same.

FIGS. 2 and 3 illustrate details of guide rails and steering arms.

FIGS. 2a and 3a are top views illustrating end portions of the guide rails and steering arms, respectively.

FIG. 8 is a perspective view of a locking member according to the invention.

FIG. 9 illustrates a diagrammatically represented upper view of the front portion of the tractor.

FIG. 10 is a diagrammatically represented lateral view of the tractor and a hoisting implement such as a bucket of the lifting unit of the tractor.

FIG. 11 illustrates an upper view of the tractor and the hoisting implement.

Figure 4:
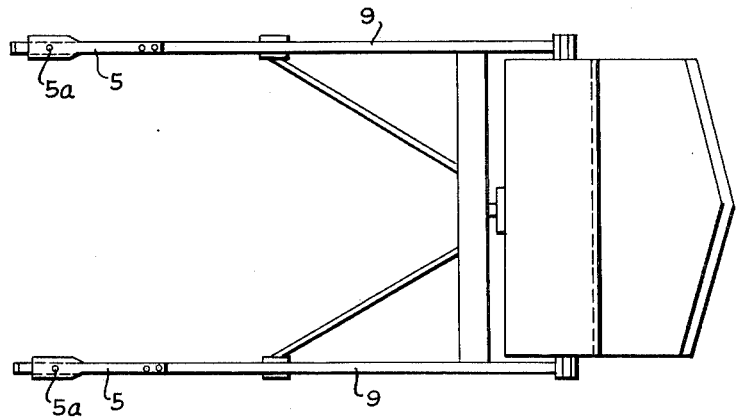
FIGS. 4 and 5 show the hoisting implement viewed from above and detached from the tractor.
Figure 5:
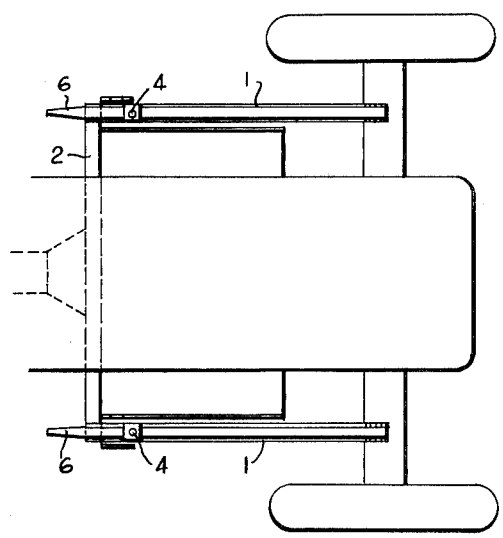
Figure 7:
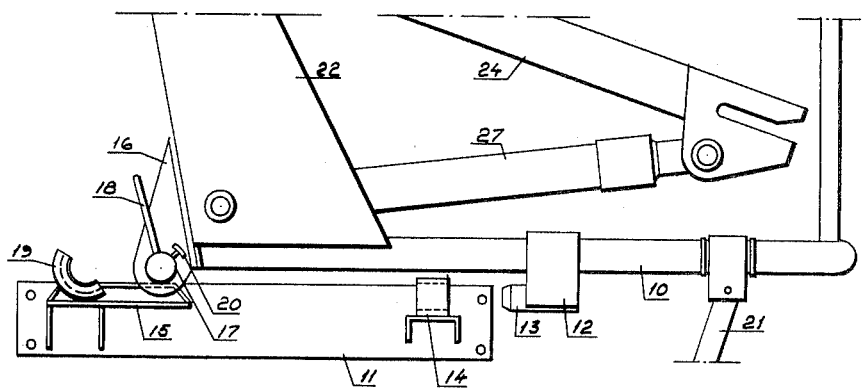
FIG. 7 shows a portion of the loading unit.

For simplicity of illustration FIGS. 1–5 only show how the hoisting implement of the tractor is removably connected to the lifting unit thereof, while FIGS. 6–11 illustrate in greater detail how the lifting unit of the tractor is adapted to be removably coupled to the tractor by means of manually operable locking members.

First of all, the arrangement and its function will be described with reference to FIGS. 1–5. The two guide rails are designated by 1, while 2 denotes a center pin, to which the upper end portion of each guide rail is pivotally secured. The lower connection of said guide rail to the lifting unit of the arrangement is designated by 3, said lifting unit being of the hydraulic kind in the present case. 4 denotes the locking pins located on the upper side portion of each guide rail and 5 designates apertured resilient members, the numeral 6 representing a lever arranged on each guide rail. A guide groove of the guide rail is designated by 7, and 8 denotes guide abutments arranged on the hoisting arms.

In applying this device to a tractor it is necessary that the hoisting arms 9 are fitted into the guide rails 1. Said hoisting arms run automatically over the locking pins 4 with the aid of the upwardly bent end portions of the resilient members 5, said pins being simultaneously fixed in the apertures provided in the resilient members 5. To ensure a reliable guidance the guide rails 1 are provided with guide grooves 7 at the abutments 3 of the hoisting members, and in addition the upper edge portion of each guide rail is provided with locking pins 4. Said locking pins cooperate with the apertured resilient members 5 of the hoisting arms 9. As best shown in FIGS. 2 and 2a, each guide rail 1 carries a separate lever 6 located at the upper end portion of the rail. Each lever 6 is hingedly mounted on a pin 6a with the aid of a spring 6b. When the hoisting arms 9 with their resilient members 5 are fitted into the guide rails 1, the hoisting arms 9 move over the locking pins 4. Each resilient member 5 has an aperture 5a provided in its upwardly bent end portion. When the hoisting arms 9 are slid upwardly the pins 4 of the guide rails 1 fit into the apertures 5a of the members 5 with the result that the hoisting arms 9 are locked. FIGURE 1 shows this locked position in which the end portions of the levers 6 carried by the guide rails are located under the resilient members 5. The hoisting arms 9 may be disengaged merely by pressing down the levers 6, so that their end portions will force the resilient members 5 out of their locking engagement with the pins 4. To release said resilient members from the locking pins each guide rail has a lever 6 arranged thereon, at the depression of which the device is detached from the lifting unit. When detaching the lifting unit, the coupling pin 18 is moved from a downwardly directed locking position wherein the shoulder 20 fits in the guide 19 (FIG. 8). In the unlocked position (FIGS. 7 and 8) the lifting unit can be pulled manually forwards; the legs 21 are lowered and serve as a support while the unit is pulled out of the tractor completely.

In case the tractor is provided with a cabin, a wire or the like is extended from the lever, so that unloading can be effected from the cabin or driver's stand.

FIGS. 6–11 illustrate a modified construction of the device. Here, 10 designates side pieces for the frame of the lifting unit, and 11 denotes plates secured to the tractor. The side pieces 10 have brackets 12 rigidly arranged thereon, said brackets being provided with pins 13 secured to the same. Sleeve-shaped members secured in the brackets are designated by 14, into which members the pins 13 are adapted to penetrate when the lifting unit and the tractor are coupled together. The rear portions of the respective plates 11 have a support 15 arranged thereon, projections 16 bearing on said supports in the rear portion of the lifting unit. Members 17 are pivotally arranged in the projections 16, said members being pivoted by means of an approximately radially directed handle 18 on the respective members. Each support 15 has a semicircular guide 19 secured thereto, which guide is of a T-shaped configuration in axial cross section. Each member 17 is provided with a shoulder 20, which when turning the member, while bearing on the guide 19, is adapted to penetrate into the latter in order thus to lock the lifting unit and the tractor together. Swingably arranged legs on the side pieces 10 are denoted by 21, said legs forming supports for the lifting unit in a position detached from the tractor.

Upwardly directed arms 22 are secured to the side pieces 10 of the lifting unit, on the upper end portions of which arms the guide rails 24 adapted for removable coupling of the lifting unit and a hoisting implement 23 are swingly arranged on pins 25. As stated above, the hoisting implement 23 is provided with hoisting arms 26, which are adapted to be removably locked together with the guide rails 24 of the lifting unit. The guide rails 24 are operable by means of devices 27, which are of the hydraulic kind in the present case.

Figure 6:
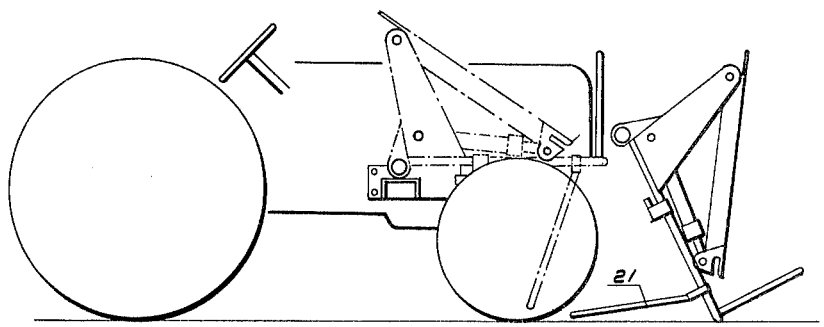
FIG. 6 shows the loading unit as detached from the tractor.

In detaching the hoisting implement and the lifting unit from the tractor, said implement is first loosened, after which the members 17 are turned off the locking position in the guides 19, whereupon the lifting unit is moved forward and is brought to the ground into the position shown in FIG. 6 with the aid of the legs 21.

What is claimed is:

1. In combination with a tractor, a lifting unit connected with said tractor and having pivots, a pair of arms swingably mounted upon said pivots, and locking devices carried by said arms adjacent said pivots, a loading implement, two arms carried by said loading implement and locking devices carried by the second-mentioned arms, the first-mentioned arms being adapted upon movement of the tractor toward said implement to engage and guide the second-mentioned arms, to provide operative contact between the first-mentioned locking devices and the second-mentioned locking devices and to move said locking devices into locking positions, thereby removably coupling the loading implement with the lifting unit, manually operable means unlocking said locking devices for detaching said loading implement from said lifting unit when the tractor is moved in the opposite direction, and manually operable locking elements removably connecting the lifting unit to the tractor, wherein said locking elements comprise a semicircular guide member of T-shaped axial cross section, a rotary member having an abutment adapted to engage said guide, a handle connected with said rotary member for rotating said rotary member, one of said members being mounted on the tractor and the other one of said members being mounted on the lifting unit.

2. The combination in accordance with claim 1, having a projection rigidly secured to the lifting unit, wherein the semi-circular guide member is rigidly mounted on the tractor and wherein the rotary member is mounted on said projection.

3. The combination in accordance with claim 1, further comprising two plates attached to the sides of the tractor, each of said plates having a semi-circular guide member secured thereto.

References Cited by the Examiner
UNITED STATES PATENTS

| | | | |
|---|---|---|---|
| 2,761,268 | 9/1956 | Johnson | 172—275 X |
| 2,812,084 | 11/1957 | Silbaugh | 214—140 |
| 2,833,432 | 5/1958 | Foster | 214—131 |
| 2,883,776 | 4/1959 | Orscheln | 172—273 X |
| 3,043,375 | 7/1962 | Astrom | 172—273 X |
| 3,131,823 | 5/1964 | Foster et al. | 214—140 X |

HUGO O. SCHULZ, *Primary Examiner.*